(12) United States Patent
Kitanaka

(10) Patent No.: US 7,969,106 B2
(45) Date of Patent: Jun. 28, 2011

(54) VECTOR CONTROLLER FOR PERMANENT-MAGNET SYNCHRONOUS ELECTRIC MOTOR

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 259 days.

(21) Appl. No.: 12/441,857

(22) PCT Filed: Oct. 19, 2006

(86) PCT No.: PCT/JP2006/320846
§ 371 (c)(1),
(2), (4) Date: Mar. 18, 2009

(87) PCT Pub. No.: WO2008/047438
PCT Pub. Date: Apr. 24, 2008

(65) Prior Publication Data
US 2010/0066283 A1    Mar. 18, 2010

(51) Int. Cl.
*H02P 21/00* (2006.01)
(52) U.S. Cl. .................. 318/400.02; 318/700; 318/432; 318/434
(58) Field of Classification Search ............. 318/400.02, 318/700, 400.01, 798, 799, 801, 811, 430, 318/432, 434
See application file for complete search history.

(56) References Cited

U.S. PATENT DOCUMENTS

| | | | |
|---|---|---|---|
| 5,680,299 A | 10/1997 | Yasuda et al. | |
| 5,854,547 A | 12/1998 | Nakazawa | |
| 6,850,033 B1 * | 2/2005 | Gallegos-Lopez et al. | ... 318/807 |
| 7,242,163 B2 * | 7/2007 | Gallegos-Lopez et al. | ... 318/812 |
| 7,592,765 B2 * | 9/2009 | Rahman et al. | ......... 318/400.02 |
| 7,843,162 B2 * | 11/2010 | Bae et al. | ....................... 318/801 |
| 2006/0049792 A1 | 3/2006 | Chen et al. | |
| 2009/0295316 A1 * | 12/2009 | Patel et al. | ............... 318/400.02 |
| 2010/0140003 A1 * | 6/2010 | Saha et al. | ............... 180/65.285 |

FOREIGN PATENT DOCUMENTS

| | | |
|---|---|---|
| JP | 09-084399 A | 3/1997 |
| JP | 11-027996 A | 1/1999 |
| JP | 2000-116198 A | 4/2000 |
| JP | 2001-352798 A | 12/2001 |
| JP | 2003-125597 A | 4/2003 |

(Continued)

OTHER PUBLICATIONS

Office Action (Notice of Preliminary Rejection) dated Nov. 19, 2010, issued in the corresponding Korean Patent Application No. 2009-7005084, and an English Translation thereof.
International Search Report for PCT/JP2006/320846, completed Dec. 25, 2006.

(Continued)

*Primary Examiner* — Eduardo Colon Santana
(74) *Attorney, Agent, or Firm* — Buchanan Ingersoll & Rooney PC

(57) ABSTRACT

A method of controlling a current command by comparing voltage with a set value needs to vary the set value depending on voltage fluctuation, which involves taking a complicated control. A vector controller for a permanent-magnet synchronous electric motor, according to the present invention, can realize with a simplified configuration a field-weakening operation in a one-pulse mode in a high speed range by providing a current command compensator that corrects a current command by a corrected current command calculated based on a modulation index.

16 Claims, 9 Drawing Sheets

FOREIGN PATENT DOCUMENTS

| | | |
|---|---|---|
| JP | 2003-264999 A | 9/2003 |
| JP | 2005-218299 A | 8/2005 |
| JP | 2006-050705 A | 2/2006 |
| JP | 2006-081287 A | 3/2006 |
| JP | 2006-141095 A | 6/2006 |

OTHER PUBLICATIONS

The First Office Action dated Nov. 30, 2010, issued in the corresponding Chinese Patent Application No. 200680056165.4, and an English Translation thereof.

* cited by examiner d-axis current error *id* [A]

d-axis current error *id* [A]

VECTOR CONTROLLER FOR PERMANENT-MAGNET SYNCHRONOUS ELECTRIC MOTOR

TECHNICAL FIELD

The present invention relates to vector controllers for permanent-magnet synchronous electric motors.

BACKGROUND ART

Vector control technologies for permanent-magnet synchronous electric motors (hereinafter abbreviated as "electric motor") using an inverter are widely employed in industry. By separately controlling the magnitude and the phase of inverter output voltage, a current vector in an electric motor is optimally controlled, so that torque of the electric motor is fast and instantaneously controlled. Permanent-magnet synchronous electric motors are known as high-efficiency electric motors in comparison with induction motors because no energizing current is needed due to establishment of magnetic field by the permanent magnet and no secondary copper loss is generated due to no rotor current. For that reason, application of permanent-magnet synchronous electric motors to electric railcars has been investigated in recent years.

Subjects with controllers in applying permanent-magnet synchronous electric motors to electric railcars are to realize a stable field-weakening operation up to a high speed range and to achieve a stable transition to a one-pulse mode in which inverter loss can be minimized and voltage applied to the electric motors can be maximized. The one-pulse mode is an operation mode for inverters, in which an inverter outputs, as its output line voltage, square waves having a positive and a negative maximum rectangular voltages of 120 degree durations each that are repeated one after another with a zero voltage period of 60 degrees therebetween, in one cycle, i.e., 360 degrees.

The following method is disclosed in Patent Document 1 as a related prior art. A voltage setting unit is provided that receives a voltage fixing command and a voltage command calculated based on a current command. When the voltage fixing command is input, the voltage setting unit outputs a voltage command as a new voltage command by setting its magnitude to a predetermined voltage set value. A magnetic-field-direction (d-axis) current command is then corrected using a magnetic-field-direction (d-axis) current correcting value obtained by taking a proportional-integral control of the difference between the voltage command calculated from the current command and the new voltage command. A modulation index for the inverter is then calculated from the voltage command to control the inverter, so that a field-weakening operation is performed.

Patent Document 1: Japan Patent Application Laid-Open No. H09-84399 (see paras. [0023]-[0029]).

DISCLOSURE OF THE INVENTION

In Patent Document 1 cited above, however, how to generate the voltage fixing command is not disclosed and the voltage setting unit needs to be provided anew. Moreover, a capacitor voltage always fluctuates, so that a maximum voltage that the inverter can output also fluctuates accordingly. In order to maximize voltage applied to the electric motor according to the method disclosed in Patent Document 1, it is necessary to vary a timing of generating the voltage fixing command and to vary a voltage set value, depending on the fluctuation in the capacitor voltage, which involves taking a complicated control.

Furthermore, a value is used as the field-direction (d-axis) current correcting value that is obtained by taking the proportional-integral control of the deviation between the voltage command calculated based on a current command and the new voltage command whose magnitude is set by the voltage fixing command. Accordingly, when the deviation between the voltage command and the new voltage command is not zero, i.e., during an input to the proportional-integral control remains not zero, the control operation continuously accumulates an integration value. For that reason, when the voltage command theoretically calculated based on the current command cannot be set to a value smaller than the voltage command set anew—for example, when a torque command is excessively large for rotation speed of the electric motor—even though a magnetic-field-direction current is corrected using the magnetic-field-direction current correcting value, the difference between the voltage command and the voltage command set anew cannot be set to zero and the integration value in the proportional-integral control is continuously accumulated, so that the magnetic-field-direction current correcting value excessively increases as time elapses. When the magnetic-field-direction current correcting value becomes excessively large, the vector control cannot be normally performed. A complicated operation is therefore required in a practice use, such as limiting the integration value to a value less than an upper limit or resetting the integration value under a specified condition.

The present invention is made to solve the above-described problems, and provides a vector controller for a permanent-magnet synchronous electric motor that can realize with a simplified configuration a stable one-pulse-mode field-weakening control in a high speed range.

Means for Solving the Problem

A vector controller for a permanent-magnet synchronous electric motor, according to the present invention, controls an alternating current from an inverter that drives the permanent-magnet synchronous electric motor so as to come into coincidence with a current command, and provided with a reference phase-angle calculation unit for generating a reference phase angle of the permanent-magnet synchronous electric motor; a current command generation unit for generating the current command using a given torque command; a current control unit for making a control calculation of a current error between the current command and a current through the permanent-magnet synchronous electric motor, to output the calculated current error; a decoupling voltage calculation unit for calculating a feed-forward voltage using motor parameters of the permanent-magnet synchronous electric motor and the current command; a modulation index calculation unit for outputting a modulation index for the inverter by receiving a direct-current voltage to the inverter and a voltage command that is the sum of the current error and the feed-forward voltage; a control phase-angle calculation unit for outputting a control phase angle for the inverter by receiving the voltage command and the reference phase angle; a pulse-width-modulation signal generation unit for generating pulse-width-modulation signals for the inverter using the modulation index and the control phase angle; and a current command compensator for correcting the current command using a corrected current command calculated based on the modulation index; wherein the current command compensator sets the corrected current command to a value obtained by processing through a time delay element and by multiplying by a predetermined constant the difference between the modulation index and a predetermined modulation index set value.

Effects of the Invention

A vector controller for a permanent-magnet synchronous electric motor, according to the invention, controls an alternating current from an inverter that drives the permanent-magnet synchronous electric motor so as to come into coincidence with a current command, and provided with a reference phase-angle calculation unit for generating a reference phase angle of the permanent-magnet synchronous electric motor; a current command generation unit for generating the current command using a given torque command; a current control unit for making a control calculation of a current error between the current command and a current through the permanent-magnet synchronous electric motor, to output the calculated current error; a decoupling voltage calculation unit for calculating a feed-forward voltage using motor parameters of the permanent-magnet synchronous electric motor and the current command; a modulation index calculation unit for outputting a modulation index for the inverter by receiving a direct-current voltage to the inverter and a voltage command that is the sum of the current error and the feed-forward voltage; a control phase-angle calculation unit for outputting a control phase angle for the inverter by receiving the voltage command and the reference phase angle; a pulse-width-modulation signal generation unit for generating pulse-width-modulation signals for the inverter using the modulation index and the control phase angle; and a current command compensator for correcting the current command using a corrected current command calculated based on the modulation index; wherein the current command compensator sets the corrected current command to a value obtained by processing through a time delay element and by multiplying by a predetermined constant the difference between the modulation index and a predetermined modulation index set value. Therefore, an effect is brought about that can realize with a simplified configuration a stable one-pulse-mode field-weakening control in a high speed range.

REFERENCE NUMERALS

1: capacitor,
2: inverter,
3, 4, 5: current sensor,
6: electric motor,
7: resolver,
8: voltage sensor,
10: current command generation unit,
11: d-axis fundamental current command generation unit,
14: adder,
15: q-axis current command generation unit,
20: d-axis current control unit,
21: q-axis decoupling calculation unit, (decoupling calculation unit),
22: d-axis decoupling calculation unit (decoupling calculation unit),
23: q-axis current control unit,
30: modulation index calculation unit,
40: control phase-angle calculation unit,
50: PWM signal generation unit,
53: multiplier,
54: gain adjustment table,
55: voltage command calculation unit,
57: multi-pulse carrier-signal generation unit,
58: synchronous three-pulse carrier-signal generation unit,
59: switch,
60: pulse-mode switching process unit,
61, 62, 63: comparator,
64, 65, 66: NOT-circuit,
70: inverter angular-frequency calculation unit,
80: current command compensator,
81: limiter,
82: first-order delay element,
83: proportional gain element,
85: parameter error correction unit,
90: three-phase to dq-axis coordinate transform unit,
95: reference phase-angle calculation unit, and
100: vector controller.

BEST MODE FOR CARRYING OUT THE INVENTION

Embodiment 1

Figure 1:
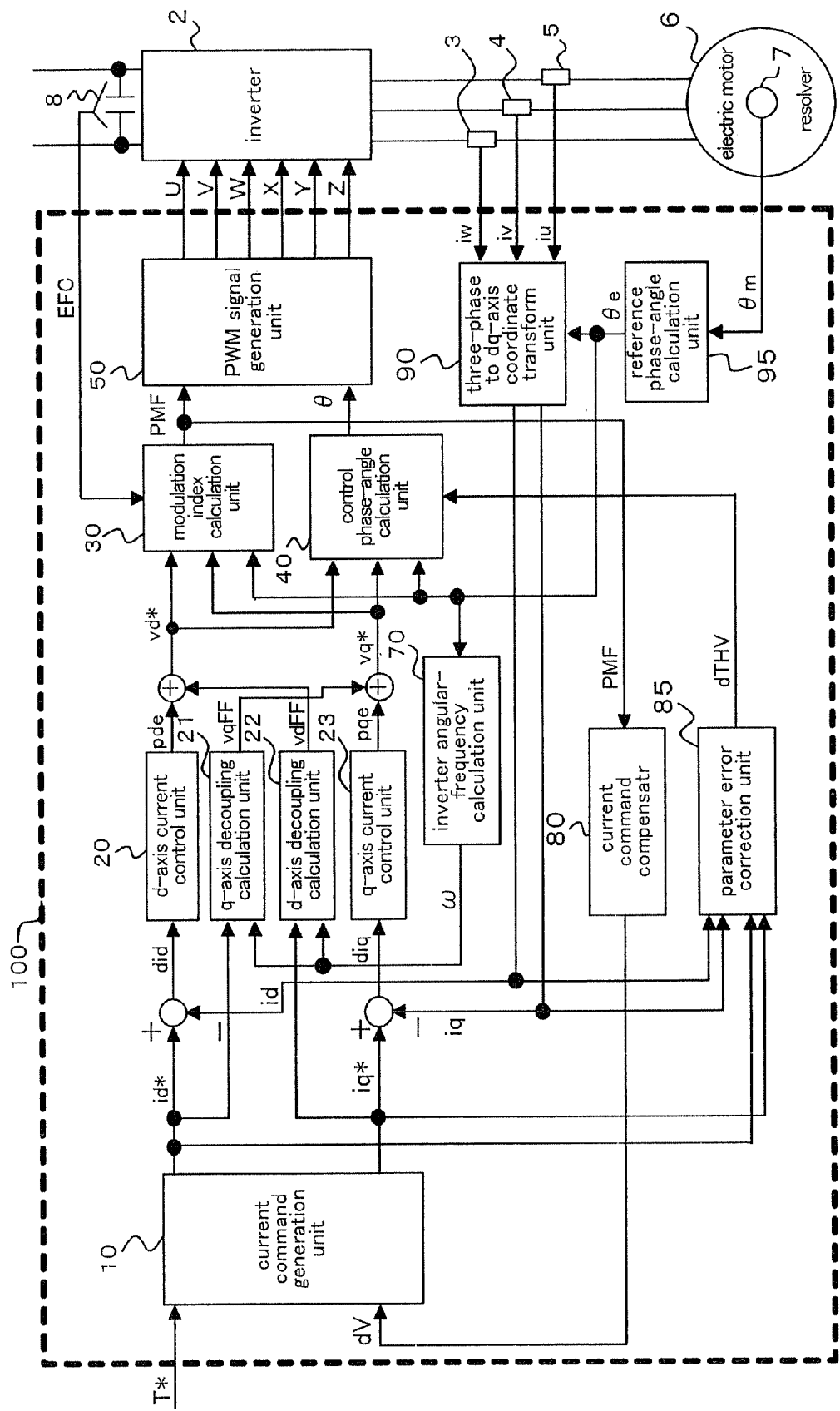
FIG. 1 is a block diagram illustrating an example of a configuration of a vector controller for a permanent-magnet synchronous electric motor, according to Embodiment 1 of the present invention.

FIG. 1 is a block diagram illustrating an example of a configuration of a vector controller for a permanent-magnet synchronous motor, according to Embodiment 1 of the present invention. As shown in FIG. 1, a main circuit is configured with a capacitor 1 that is a direct-current power source, an inverter 2 that converts direct-current voltage of the capacitor 1 into an alternating-current voltage of any given frequency, and a permanent-magnet synchronous electric motor 6 (hereinafter, simply referred to as "electric motor").

The main circuit is also provided with a voltage sensor 8 that senses voltage of the capacitor 1, current sensors 3, 4, and 5 that sense currents iu, iv, and iw through the output lines of the inverter 2. The electric motor 6 is provided with a resolver 7 that senses a rotor mechanical angle θm. Each of these sensing signals is input into a vector controller 100.

The resolver 7 may be substituted with an encoder, or a position sensorless method may be used in which a position signal is calculated from a sensed voltage, current, or the like instead of a position signal obtained by the resolver 7. In these cases, the resolver 7 is unnecessary, in other words, acquisition of a position signal is not limited to using the resolver 7.

As for the current sensors 3, 4, and 5, a configuration may be employed in which sensors are provided for at least two phase-lines since a current through the other phase line can be determined by calculation, or respective currents are determined by simulating output currents of the inverter 2 from a current on the direct-current side thereof.

The inverter 2 receives gate signals U, V, W, and X, Y, Z that are generated by the vector controller 100 to take a pulse-width-modulation (PWM) control of switching elements built in the inverter 2. A PWM voltage-source inverter is suitable for the inverter 2, and since its configuration is publicly known, a detailed description thereof is omitted.

The vector controller 100 receives a torque command T* from a external controller, not shown, and controls the inverter 2 so that torque T produced by the electric motor 6 comes into coincident with the torque command T*.

Next, a configuration of the vector controller 100 is described. The vector controller 100 is configured with a reference phase-angle calculation unit 95 that calculates a reference phase angle θe from the rotor mechanical angle θm; a three-phase to dq-axis coordinate transform unit 90 that generates a d-axis current id and a q-axis current iq from the three phase currents iu, iv, and iw sensed by the current sensors 3, 4, and 5, respectively, and from the reference phase angle θe; an inverter angular-frequency calculation unit 70 that calculates an inverter angular frequency ω from the reference phase angle θe; a current command generation unit 10 that generates a d-axis current command id* and a q-axis current command iq* from the torque command T* input from externally and a later-described corrected current command dV*; a d-axis current control unit 20 that generates a d-axis current error pde by taking a proportional-integral control of the difference between the d-axis current command id* and the d-axis current id; a q-axis current control unit 23 that generates a q-axis current error pqe by taking a proportional-integral control of the difference between the q-axis current command iq* and the q-axis current iq; a q-axis decoupling calculation unit 21 that calculates a q-axis feed-forward voltage VqFF from the d-axis current command id* and the inverter angular frequency ω; a d-axis decoupling calculation unit 22 that calculates a d-axis feed-forward voltage VdFF from the q-axis current command iq* and the inverter angular frequency ω; a modulation index calculation unit 30 that calculates a modulation index PMF, a control phase-angle calculation unit 40 that calculates a control phase angle θ from a d-axis voltage command Vd* that is the sum of the d-axis current error pde and the d-axis feed-forward voltage VdFF, a q-axis voltage command Vq* that is the sum of the q-axis current error pqe and the q-axis feed-forward voltage VqFF, the reference phase angle θe, and from a later-described control phase-angle correcting value dTHV; a PWM-signal generation unit 50 that generates the gate signals U, V, W, and X, Y, Z for the inverter 2; a current command compensator 80 for calculating the corrected current command dV by receiving the modulation index PMF; and a parameter-error correction unit 85 that calculates the control phase-angle correcting value dTHV from the d-axis current id, the q-axis current iq, the d-axis current command id*, and the q-axis current command iq*.

Here, the modulation index calculation unit 30 receives the d-axis voltage command Vd* that is the sum of the d-axis current error pde and the d-axis feed-forward voltage VdFF, the q-axis voltage command Vq* that is the sum of the q-axis current error pqe and the q-axis feed-forward voltage VqFF, the reference phase angle θe, and a voltage EFC of the capacitor 1. The PWM-signal generation unit 50 receives the modulation index PMF and the control phase angle θ.

Next, detailed configurations of each of the control blocks mentioned above will be described. The reference phase-angle calculation unit 95 calculates from the rotor mechanical angle θm the reference phase-angle θe that is an electric angle, based on the following equation (1):

$$\theta e = \theta m * PP \quad (1),$$

where PP denotes a pole pair number of the electric motor 6.

The three-phase to dq-axis coordinate transform unit 90 generates the d-axis current id and q-axis current iq from the three phase currents iu, iv, and iw and the reference phase-angle θe, based on the following equation (2):

$$\begin{pmatrix} iq \\ id \end{pmatrix} = \sqrt{\frac{2}{3}} \begin{pmatrix} \cos\theta e \cos\left(\theta e - \frac{2}{3}\pi\right) \cos\left(\theta e + \frac{2}{3}\pi\right) \\ \sin\theta e \sin\left(\theta e - \frac{2}{3}\pi\right) \sin\left(\theta e + \frac{2}{3}\pi\right) \end{pmatrix} \cdot \begin{pmatrix} iu \\ iv \\ iw \end{pmatrix} \quad (2)$$

The inverter angular-frequency calculation unit 70 calculates the inverter angular frequency ω by differentiating the reference phase angle θe, based on the following equation (3):

$$\omega = d\theta e/dt \quad (3).$$

Figure 2:
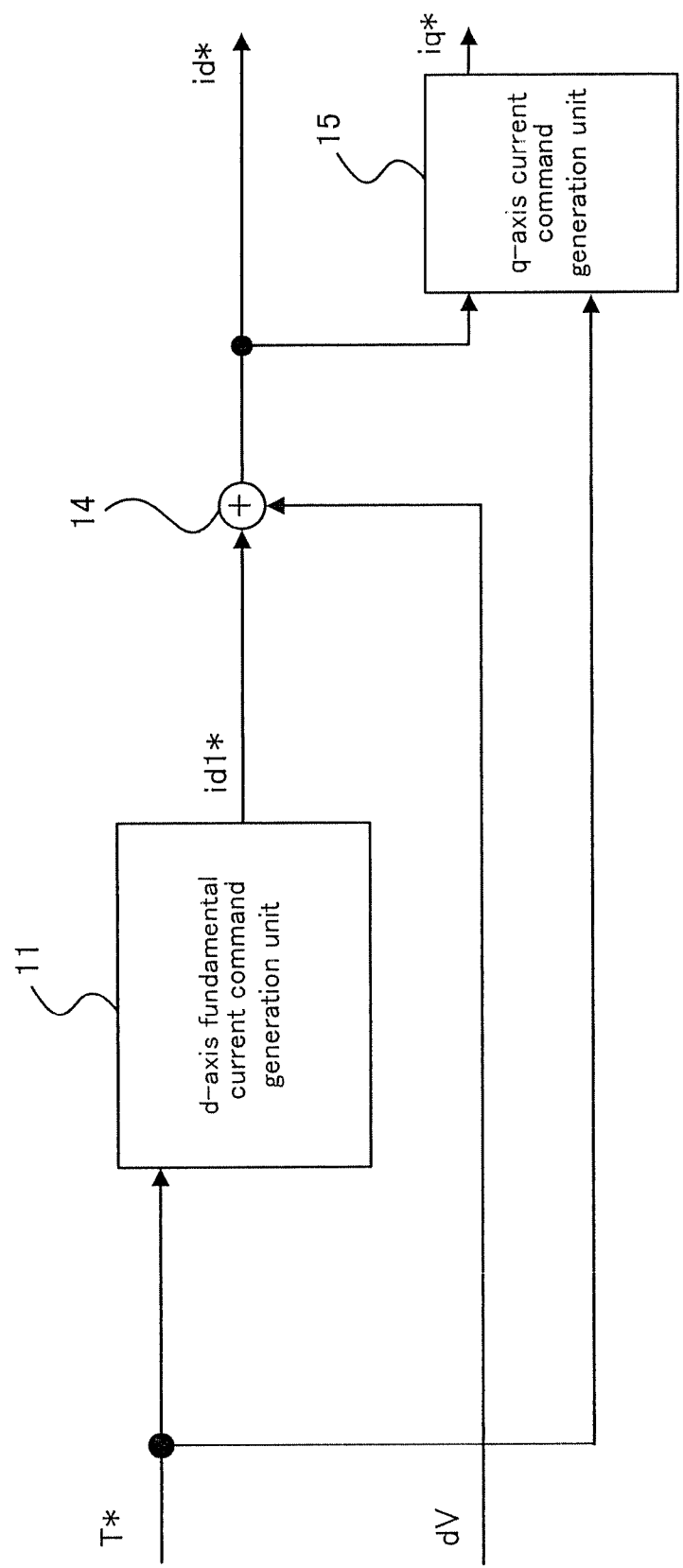
FIG. 2 is a block diagram illustrating an example of a configuration of a current command generation unit in Embodiment 1 of the invention.

A configuration of the current command generation unit 10 is described. FIG. 2 is a block diagram illustrating an example of a configuration of the current command generation unit 10 in Embodiment 1 of the invention. A d-axis fundamental current command generation unit 11 receives the torque command T*, to generate a d-axis fundamental current command id1*. A maximum torque control method that can generate a desired torque of the electric motor 6 with a minimum current is known as a method of generating the d-axis fundamental current command id1*, in which an optimum d-axis fundamental current command id1* is obtained by referencing a map on the basis of the torque command T* or by using an arithmetic expression. Since the unit can be configured by using known art, a detailed description of the unit is omitted here.

After the d-axis fundamental current command id1* is generated, the d-axis current command id* is then obtained by adding the corrected current command dV to the d-axis fundamental current command id1* by an adder 14. The corrected current command dV is provided for so-called field-weakening control. The correcting value dV has a negative value to correct the value id1* in the negative direction, so that the d-axis current command id* increases in the negative direction; whereby magnetic field is generated in such a direction as to cancel magnetic field produced by the permanent magnet of the electric motor 6, so that flux linkage of the electric motor 6 is weakened, that is, a field-weakening control is realized. Since a method of generating the corrected current command dV is a key feature of the invention, it will be described later.

The q-axis current command iq* is finally generated by a q-axis current command generation unit 15 from the d-axis current command id* and the command torque vale T*. As for a method of generating the q-axis current command, there has also been a method in which an optimum q-axis current command iq* is obtained by referencing a map or by using an arithmetic expression, as mentioned above. Since the generation unit can be configured by using known art, a detailed description of the unit is omitted here.

The q-axis current control unit 23 and the d-axis current control unit 20 generate the q-axis current error pqe and the d-axis current error pde obtained by proportional-integral amplification of the differences between the q-axis current command iq* and the q-axis current, and between the d-axis current command id* and the d-axis current, based on the following equations (4) and (5), respectively:

$$pqe=(K_1+K_2/s)*(iq*-iq) \quad (4) \text{ and}$$

$$pde=(K_3+K_4/s)*(id*-id) \quad (5),$$

where $K_1$ and $K_3$ are proportional gains, and $K_2$ and $K_4$ are integral gains.

As described later, the q-axis current error pqe and the d-axis current error pde are gradually decreased to zero after a transition from a control mode 1 (described later) to a control mode 2 (described later), and are gradually increased when transition is made from the control mode 2 to the control mode 1 on the contrary.

The d-axis decoupling calculation unit 22 and the q-axis decoupling calculation unit 21 that are decoupling voltage calculation units calculate the d-axis feed-forward voltage VdFF and the q-axis feed-forward voltage VqFF, based on the following equations (6) and (7), respectively:

$$VdFF=(R_1+s*Ld)*id*-\omega*Lq*iq* \quad (6) \text{ and}$$

$$VqFF=(R_1+s*Lq)*iq*+\omega*(Lq*id*+\phi a) \quad (7),$$

where $R_1$ denotes primary winding resistance (Ω), Ld and Lq denote d-axis inductance (H) and q-axis inductance (H), respectively, φa, magnetic flux of the permanent magnet (Wb), and s, the differential operator.

The modulation index PMF here denotes a ratio of command output-voltage vector magnitude VM* for the inverter to the maximum voltage $VM_{max}$ that the inverter is able to output, and PMF=1.0 indicates that the command output-voltage vector magnitude VM* is equal to the maximum voltage $VM_{max}$.

By thus defining the modulation index PMF, the modulation index PMF becomes zero when the command output-voltage vector magnitude VM* is zero and becomes 1.0 under the condition that the inverter outputs its maximum voltage. An output ratio of inverter voltage is thereby easy to notice intuitively, which has an advantage that makes it easy to construct and set control processes in which the modulation index PMF is referred to, such as later-described switching processes of pulse modes and control modes.

The modulation index calculation unit 30 calculates, according to the before-mentioned definition of the modulation index PMF, the modulation index PMF from the d-axis voltage command Vd* that is the sum of the d-axis current error pde and the d-axis feed-forward voltage VdFF, the q-axis voltage command Vq* that is the sum of the q-axis current error pqe and the q-axis feed-forward voltage VqFF, the reference phase angle θe, and the voltage EFC of the capacitor 1, based on the following equation (8):

$$PMF=VM*/VM_{max} \quad (8),$$

where $$VM_{max}=(SQRT(6)/\pi)*EFC \quad (9) \text{ and}$$

$$VM*=SQRT(Vd*^2+Vq*^2) \quad (10).$$

The control phase-angle calculation unit 40 calculates the control phase angle θ from the d-axis voltage command Vd* that is the sum of the d-axis current error pde and the d-axis feed-forward voltage VdFF, the q-axis voltage command Vq* that is the sum of the q-axis current error pqe and the q-axis feed-forward voltage VqFF, the reference phase angle θe, and the control phase-angle correcting value dTHV, based on the following equation (11):

$$\theta=\theta e+\pi+THV+dTHV \quad (11),$$

where $$THV=\tan^{-1}(Vd*/Vq*) \quad (12).$$

Figure 3:
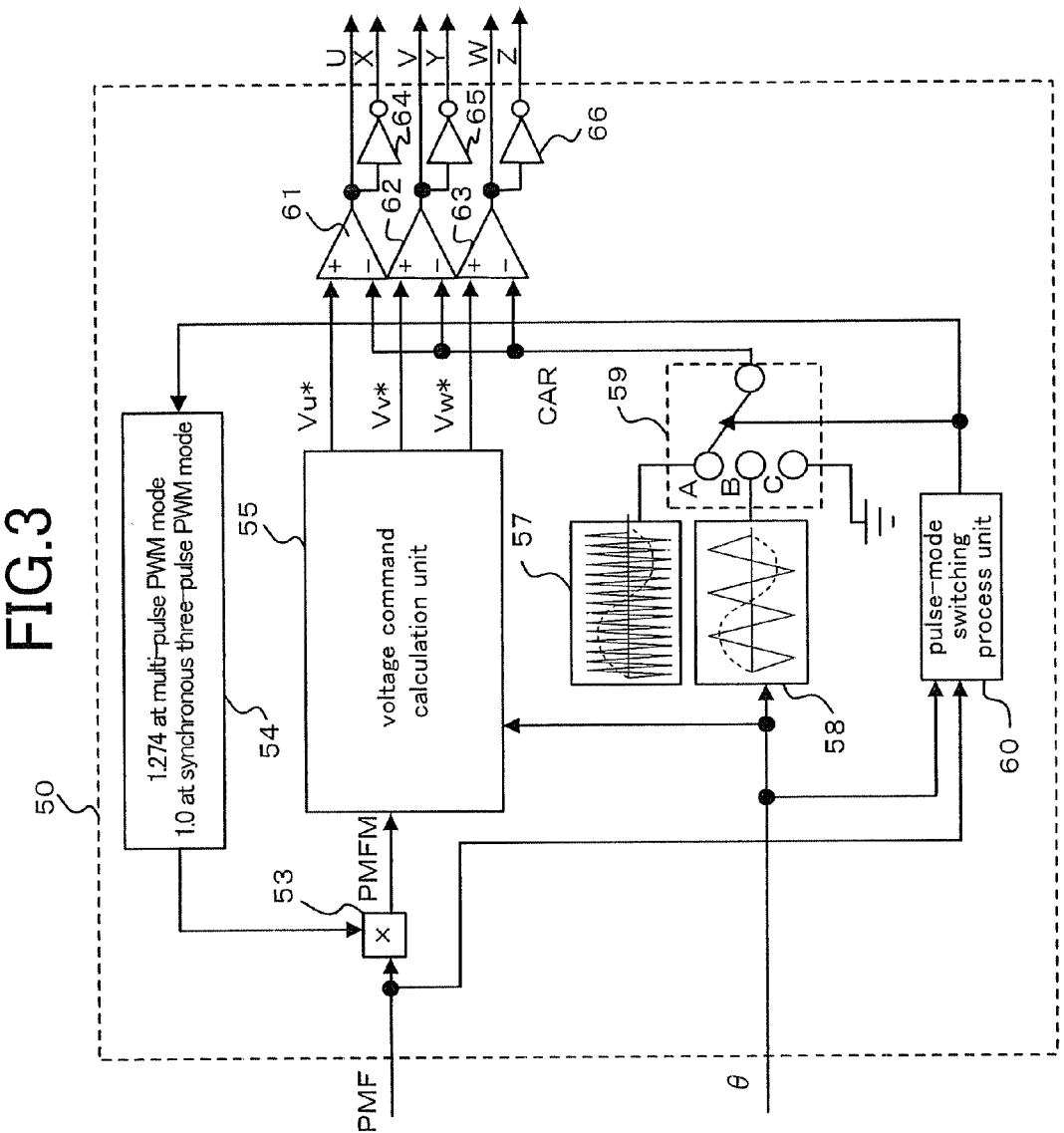
FIG. 3 is a block diagram illustrating an example of a configuration of a PWM-signal generation unit in Embodiment 1 of the invention.

Next, a configuration of the PWM-signal generation unit 50 is described. FIG. 3 is a block diagram illustrating an example of a configuration of the PWM-signal generation unit 50 in Embodiment 1 of the invention. As shown in FIG. 3, a command-voltage generation unit 55 generates from the modulation index PMF and the control phase-angle θ a command U-phase voltage value Vu*, a command V-phase voltage value Vv*, and a command W-phase voltage value VW* that are command three phase voltages, based on the following equations (13) through (15):

$$Vu*=PMFM* \sin \theta \quad (13),$$

$$Vv*=PMFM* \sin (\theta-(2*\pi/3)) \quad (14), \text{ and}$$

$$Vw*=PMFM* \sin (\theta-(4*\pi/3)) \quad (15).$$

Here, the coefficient PMFM is command voltage amplitude obtained by multiplying a modulation index PMF by an output of a gain adjustment table 54 by a multiplier 53. The gain adjustment table 54 is for correcting the difference between a relation of an inverter output voltage VM to the modulation index PMF in a multi-pulse PWM mode and that in a synchronous three-pulse PWM mode. The correction is outlined as follows.

The maximum voltage (RMS value) that the inverter can output without distortion is 0.612*EFC in the multi-pulse PWM mode and is $VM_{max}$(=0.7797*EFC) in the synchronous three-pulse PWM mode. Namely, an output voltage of the inverter for a modulation index PMF in the multi-pulse PWM mode becomes 1/1.274, compared with that in the synchronous three-pulse PWM mode. In order to compensate the difference, a modulation index PMF in the multi-pulse PWM mode is multiplied by 1.274 to be output as the command voltage amplitude PMFM into the above-mentioned command-voltage calculation unit 55.

The command U-phase voltage value Vu*, the command V-phase voltage value Vv*, and the command W-phase voltage value Vw* are then compared in magnitude with carrier signals CAR by comparators 61, 62, and 63, so that the gate signals U, V, and W are generated, respectively. The gate signals X, Y, and Z are also generated from the gate signals U, V, and W via NOT-circuits 64, 65, and 66, respectively. The carrier signals CAR are signals each selected, via a switch 59 by a pulse-mode switching process unit 60, among a multi-pulse carrier signal A (around 1 kHz in general) generated in a multi-pulse carrier-signal generation unit 57, a synchronous three-pulse carrier signal B generated in a synchronous three-pulse carrier-signal generation unit 58, and a zero value C employed in a one-pulse mode. The multi-pulse carrier signal A and the synchronous three-pulse carrier signal B each take values ranging from −1.0 to 1.0 centered at zero.

In addition, the pulse-mode switching process unit 60, depending on a modulation index PMF and a control phase angle θ, operates to change the switch 59 to the asynchronous carrier A side when the modulation index PMF is in a low range (equal to or lower than 0.785), to the synchronous three-pulse carrier B side when it is in a range from 0.785 to lower than 1.0, and to the zero value C side, when it reaches 1.0, respectively.

Such configuration allows a pulse mode to be automatically changed to the one-pulse mode at the timing when a modulation index PMF equals 1.0, and, on the contrary, to be automatically changed to the synchronous three-pulse mode when a modulation index PMF becomes lower than 1.0. Namely, it is possible to easily vary output voltage of the inverter 2 from the minimum to the maximum.

While the threshold for a modulation index PMF is set to the value of 0.785 at which the asynchronous carrier and the synchronous three-pulse carrier are switched, the threshold may be smaller than this value.

The synchronous three-pulse PWM mode here referred to is a pulse mode necessary for outputting a voltage corresponding to a modulation index PMF equal to or higher than 0.785 which voltage is impossible to be output in the multi-pulse PWM mode. Although such a voltage corresponding to the synchronous three-pulse mode can also be output by employing a configuration such that an over-modulation method is used in a multi-pulse PWM mode, a synchronous five-pulse mode, a synchronous nine-pulse mode, or the like, an output of the inverter 2 becomes significantly nonlinear with a modulation index PMF, which rises necessity for correcting the nonlinearity, making the configuration complicated.

Each of the calculation equations shown above is generally processed by a microcomputer using software. However, when the calculation is made with low precision (small bit count) to reduce calculating loads on the microcomputer, a modulation index PMF does not exactly reach 1.0 but may have a value smaller than it such as 0.999 at the timing when command output-voltage vector magnitude VM* for the inverter becomes the maximum voltage $VM_{max}$. In this case, although some voltage jump is involved, it is practicable that a pulse mode is changed to the one-pulse mode when a modulation index PMF becomes, for example, 0.95 or larger.

Furthermore, a timing of changing a pulse mode may be finely adjusted by using the control phase angle θ. By the fine adjustment, current through the electric motor can be prevented from rippling at changing the pulse mode.

Figure 4:
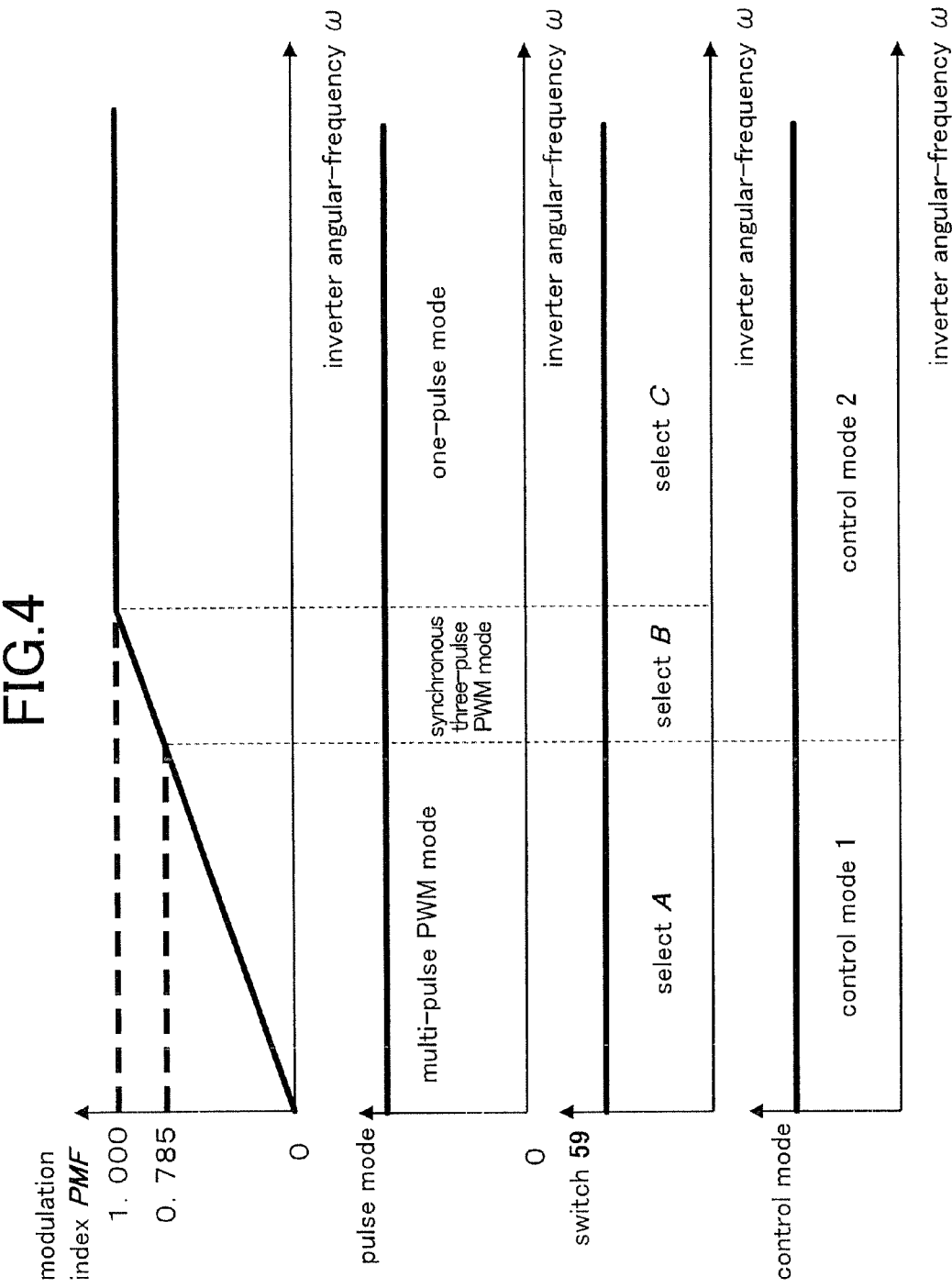
FIG. 4 shows charts for illustrating a modulation index PMF, pulse-mode transitions, switching operations, and a control-mode transition, with inverter angular frequency ω, in Embodiment 1 of the invention.

FIG. 4 shows charts for illustrating the modulation rate PMF, transitions over the pulse modes, operations of the switch 59, and a transition over the control modes, with the inverter angular frequency ω, in Embodiment of the invention. As shown in FIG. 4, when electric railcars run at a low speed, i.e., the inverter angular frequency ω is low, a modulation index PMF is small and the switch 59 is selected to the A side, i.e., a pulse mode is set to the multi-pulse PWM mode. At the same time, a control mode is set to the control mode 1, and the q-axis current control unit 23 and the d-axis current control unit 20 operate according to the above equations (4) and (5), respectively. When the modulation index PMF equals to or exceeds 0.785 with increasing electric railcar speed, since an output voltage of the inverter 2 is saturated in the multi-pulse PWM mode, the switch 59 is changed to the B side to set the pulse mode to the synchronous three-pulse PWM mode.

At the same time, the control mode is selected to the control mode 2, and the d-axis current control unit 20 and the q-axis current control unit 23 cease their calculations so that their outputs are reduced to zero. The reason for reducing to zero is as follows. In the synchronous three-pulse PWM mode, the number of pulses per half cycle of output voltage of the inverter decreases from ten or more in the multi-pulse PWM mode to three, so that a control delay increases. If the d-axis current control unit 20 and the q-axis current control unit 23 are left to continue the calculations, there is a fear that the control system becomes unstable. Therefore, the d-axis current control unit 20 and the q-axis current control unit 23 are stopped to make their calculations.

In addition, it is preferable for avoiding a shock produced at the mode change that the outputs of the d-axis current control unit 20 and the q-axis current control unit 23 be gradually reduced toward zero with a predetermined time constant during the reduction process.

In control mode 2, a mismatch between electric motor parameters and control parameters arises from stopping the calculations of the d-axis current control unit 20 and the q-axis current control unit 23. Deviations of a torque of and a current through the electric motor 6 from their command values are generated from the mismatch and like. Control errors such as the deviations can be suppressed by correcting the control phase angle θ using the control phase-angle correcting value dTHV generated by the parameter-error correction unit 85 using the d-axis current id, the q-axis current iq, the d-axis current command id*, and the q-axis current command iq*. A detailed configuration of the parameter-error correction unit 85 will be described later.

In addition, the output of the parameter error correction unit 85 is increased after the change from the control mode 1 to the control mode 2, and decreased to zero after the change from the control mode 2 to the control mode 1 on the contrary. The increase and the decrease are preferably performed slowly with a predetermined time constant. An unstable control can thereby be avoided that results from competition of the output of the d-axis current control unit 20 or the q-axis current control unit 23 with that of the parameter-error correction unit 85.

When the modulation index PMF becomes 1.0 or larger with electric railcar speed being further increased, the pulse mode is changed to the one-pulse mode by changing the switch 59 to the C side. The control mode still remains the control mode 2. When the electric railcars slow down by regenerative brakes, which is not shown, the pulse mode is transited from the one-pulse mode to the multi-pulse PWM mode through the synchronous three-pulse PWM mode and the switch 59 is changed from the C side to the A side through the B side in a sequence reverse to the above, so that the control mode is transited from the control mode 2 to the control mode 1.

Figure 5:
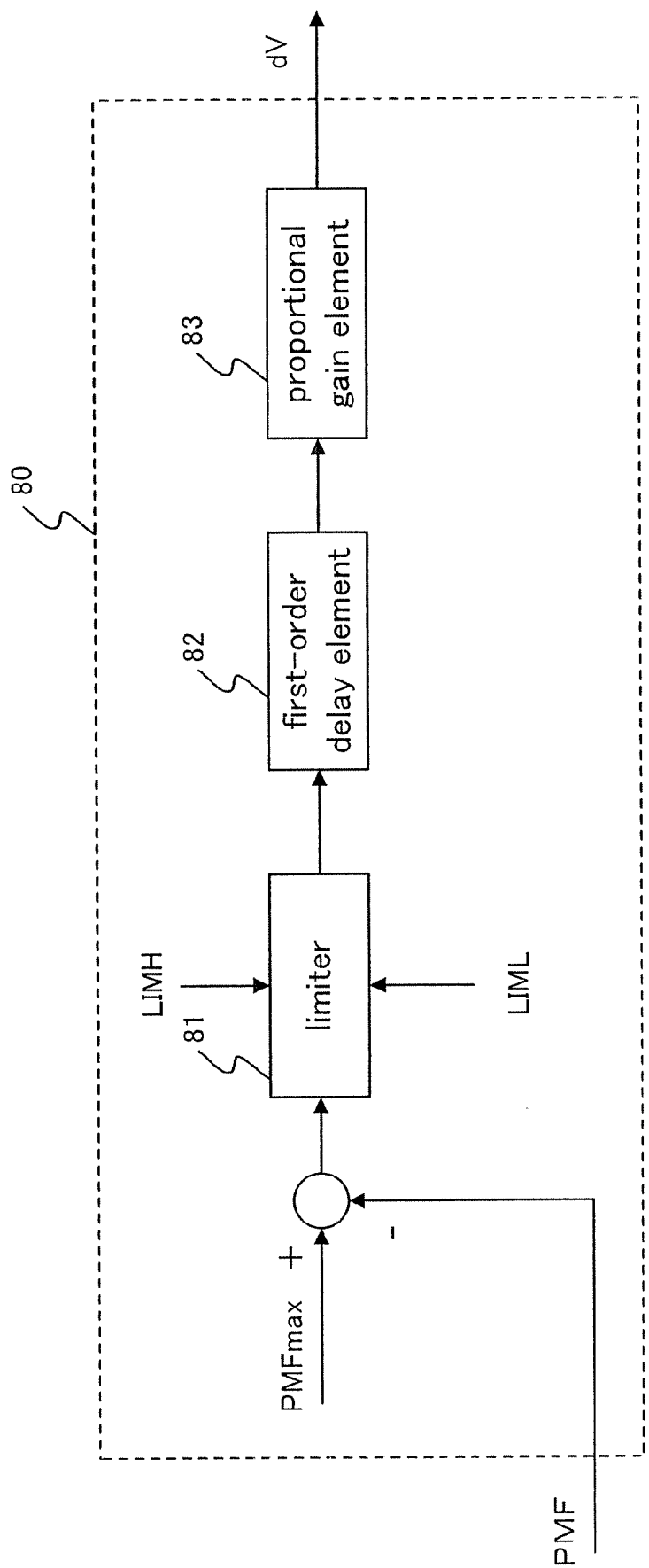
FIG. 5 is a block diagram illustrating an example of a configuration of a current command compensator in Embodiment 1 of the invention.

Next, a description is made of a configuration of the current command compensator 80 that is a key component to demonstrate effects of the invention. FIG. 5 is a block diagram illustrating an example of a configuration of the current command compensator 80 in Embodiment 1 of the invention. As shown in FIG. 5, the difference between a modulation index set value $PMF_{max}$ and a modulation index PMF is input into a limiter 81 that is able to limit the difference to the range between an upper limit and a lower limit. The limiter 81 is configured so as to be able to limit its input signal to the range between an upper deviation-limit set value LIMH and a lower deviation-limit set value LIML, to output the limited signal. The output of the limiter 81 is input into a first-order delay element 82. An output of the first-order delay element 82 is input into a proportional gain element 83 and multiplied by a gain K that is a predetermined coefficient, to be output as the corrected current command dV. With the first-order delay element 82, even when the difference between the modulation index set value $PMF_{max}$ and the modulation index PMF upsurges, the corrected current command dV increases with a predetermined time constant.

As described above, the corrected current command dV is expressed as the following equation (16):

$$dV = LIMHL(PMF_{max} - PMF)*(1/(1+s\tau))*K \qquad (16),$$

where LIMHL( ) denotes a function that limits a value in the parenthesis to the range between the upper deviation-limit set value LIMH and the lower deviation-limit set value LIML, and $\tau$ denotes a first-order delay time constant. The time constant $\tau$ is 10 ms to 100 ms orders of magnitude.

Preferable settings of the modulation index set value $PMF_{max}$, the upper deviation-limit set value LIMH, and the lower deviation-limit set value LIML are as follows for Embodiment. The modulation index set value $PMF_{max}$ is preferably set to 1.0. This is because that, at the time when a modulation index PMF reaches 1.0, i.e., an output voltage of the inverter 2 reaches its maximum voltage, an input to the limiter 81 becomes zero or less, so that a negative corrected current command dV can be generated, which is preferable for performing a field-weakened control while the output voltage of the inverter 2 is maximized.

The upper deviation-limit set value LIMH is preferably set to a value that is obtained by dividing by the gain K the maximum d-axis current $Id_{max}$ (referred to as "maximum field-weakening current"), which is calculated in advance, required to flow through the electric motor 6 when producing a desired torque command T*, taking into account a fluctuation range of the capacitor voltage EFC. For example, when the maximum d-axis current $Id_{max}$ is 100 A and the gain K is set to 100,000, the upper deviation-limit set value LIMH becomes 0.001. The lower deviation-limit set value LIML is preferably set to zero. By thus setting the set values, when a modulation index PMF is 1.0 or smaller, i.e., when there is a margin between a voltage command and the maximum output voltage of the inverter 2, the corrected current command dV is not output. At the time when the modulation index PMF exceeds 1.0, i.e., when a voltage command slightly exceeds the maximum output voltage of the inverter 2, the limiter 81 generates a negative output value, so that a corrected current command dV is output. An unnecessary d-axis current id therefore does not flow, which allows a current through the electric motor 6 to be minimized.

By thus generating a corrected current command dV based on the modulation index PMF that is a value obtained by normalizing the magnitude of a command output-voltage vector for the inverter by the voltage EFC of the capacitor 1, an appropriate corrected current command dV can be obtained, independently of the magnitude of the voltage EFC of the capacitor 1, depending on an excess ratio of the command output-voltage vector magnitude for the inverter to the maximum voltage that the inverter 2 is able to output. Accordingly, stable operation can also be obtained in application to electric railcars whose voltage EFC of the capacitor 1 fluctuates.

Furthermore, by generating the corrected current command dV using the combination of the proportional gain element 83 and the first-order delay element 82, a stable operation can be performed even when the electric motor 6 falls into an operation range where the field-weakening control is not theoretically applied, for example, when a torque command T* is excessive for rotation speed of the electric motor 6. In such a situation, even though the d-axis current command id* is corrected to a negative by a corrected current command dV, the magnitude of the command output-voltage vector for the inverter cannot be reduced to the maximum voltage or less that the inverter is able to output. Namely, with the combination of the proportional gain element 83 and the first-order delay element 82, even in the situation where a modulation index PMF remains more than 1.0, a final value of the corrected current command dV never continue to increase to an excessively large value in the configuration of the invention, since the correcting value dV settles to an appropriate value determined from the modulation index PMF, the upper deviation-limit set value LIMH, and the gain K. In other words, even when the torque command T* is excessive, an appropriate field-weakening control can be performed.

In a case of a configuration made with a proportional-integral controller having an integral element as seen in conventional configuration examples, instead of the above-mentioned combination of the gain K and the first-order delay element 82, when a modulation index PMF remains larger than 1.0, an integration value is accumulated in the integral element and a corrected current command dV continues to increase to an excessively large value as time elapses, so that the electric motor 6 cannot be properly controlled. Moreover, even when the motor recovers from such an uncontrolled state to the normal state, it takes time to decrease the excessively accumulated integration value to a proper value, which brings poor control during this interim period. For that reason, a complicated operation is required in a practice use, such as setting of an upper limit for the integration value or resetting of the integration value at a predetermined timing.

According to the invention, on the contrary, no such complicated operation is needed to perform a stable field-weakening control.

Next, a description is made of a configuration of the parameter-error correction unit 85 that is a key component to demonstrate the effects of the invention. The parameter-error correction unit 85 calculates the control phase-angle correcting value dTHV from the d-axis current id, the q-axis current iq, the d-axis current command id*, and the q-axis current command iq*, based on the following equation (17):

$$dTHV = (K_5 + K_6/s)*((id^{*2} + iq^{*2}) - (id^2 + iq^2)) \qquad (17),$$

where $K_5$ and $K_6$ denote a proportional gain and an integral gain, respectively, whereby the correction unit operates as a proportional-integral controller.

The first term on the right-hand side of the equation (17) expresses the sum of squares of the d-axis current command id* and the q-axis current command iq*, and denotes the square of the magnitude of the current command vector. The second term on the right-hand side expresses the sum of squares of the d-axis current id and the q-axis current iq, and denotes the square of the magnitude of the current vector.

The d-axis current id and the q-axis current iq that are electric motor currents may sometimes deviate from the d-axis current command id* and the q-axis current command iq* that are current commands, respectively, by permanent-magnet flux $\phi_a$ variation and electric-motor parameter variation due to temperature rise of and current through the electric motor. In this case, by subtracting the square of the current vector magnitude from that of the current command vector magnitude and by taking a proportional-integral control of the subtraction result, the control phase angle θ is corrected using the control phase-angle correcting value dTHV corresponding to the deviation. An operation can thereby be performed so that the electric motor current comes into coincidence with the current command, which allows preventing the torque T of the electric motor 6 from deviating from the torque command T* therefor.

Instead of using the equation (17), the control phase-angle correcting value dTHV may be calculated using an equation (18):

$$dTHV=(K_5+K_6/s)*(SQRT(id^{*2}+iq^{*2})-SQRT(id^2+iq^2)) \qquad (18).$$

The first term on the right-hand side of the equation (18) expresses the square root of the sum of squares of the d-axis current command id* and the q-axis current command iq*, and denotes the magnitude of the current command vector. The second term on the right-hand side expresses the square root of the sum of squares of the d-axis current id and the q-axis current iq, and denotes the magnitude of the current vector.

The d-axis current id and the q-axis current iq that are electric motor currents may sometimes deviate from the d-axis current command id* and the q-axis current command iq* that are current commands, respectively, by permanent-magnet flux $\phi_a$ variation and electric-motor parameter variation due to temperature rise of and current through the electric motor. In this case, by subtracting the current vector magnitude from the current command vector magnitude and by taking a proportional-integral control of the subtraction result, the control phase angle θ is corrected using the control phase-angle correcting value dTHV corresponding to the deviation. An operation can thereby be performed so that the electric motor current comes into coincidence with the current command, which allows preventing the torque T of the electric motor 6 from deviating from the torque command T* therefor.

In addition, since the equation (18) is a complicated equation owing to including two square-root operations in comparison with the equation (17), the calculation takes time and involves a significant load on a microcomputer. Accordingly, it is preferable to use the equation (17).

Figure 6:
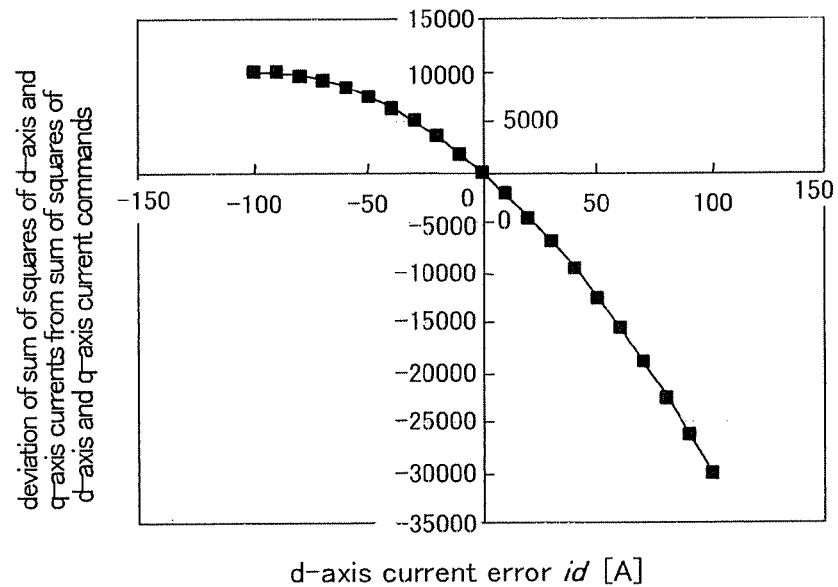
FIG. 6 is a graph showing a relation of the deviation between the sum of squares of dq-axis current commands and that of squares of dq-axis currents, to a d-axis current error, in Embodiment 1 of the invention.
Figure 7:
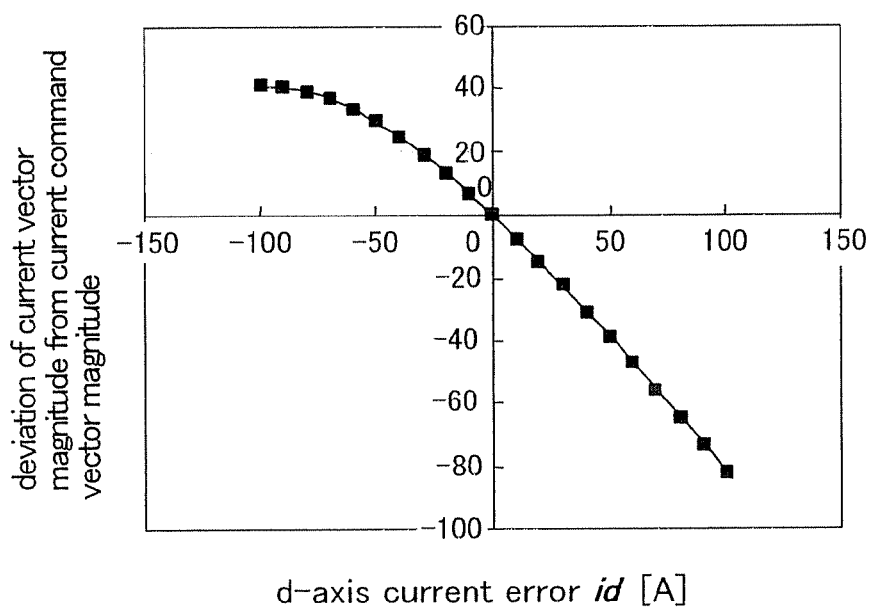
FIG. 7 is a graph showing a relation of the deviation between the magnitude of current command vectors and that of current vectors, to the d-axis current error, in Embodiment 1 of the invention.
Figure 8:
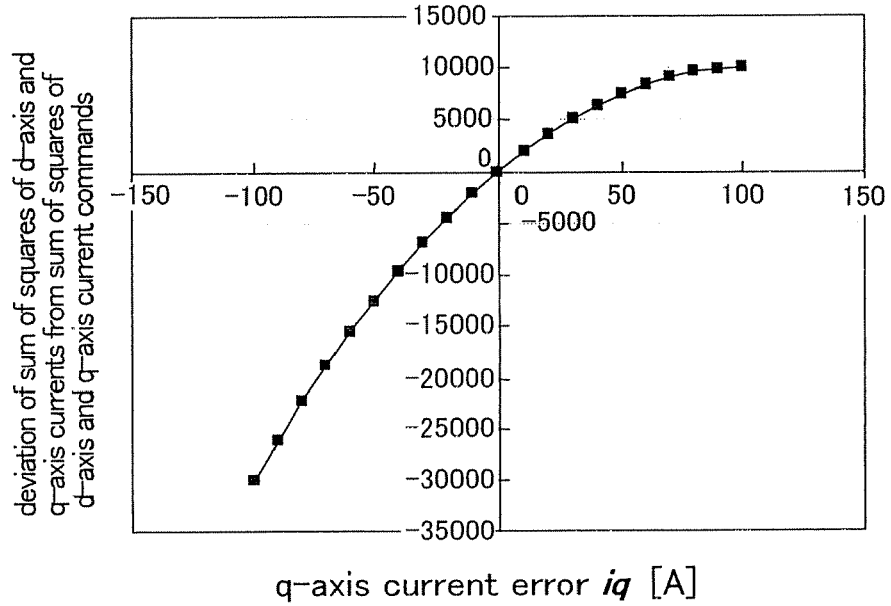
FIG. 8 is a graph showing a relation of the deviation between the sum of squares of dq-axis current commands, and that of squares of dq-axis current commands, to a q-axis current error, in Embodiment 1 of the invention.
Figure 9:
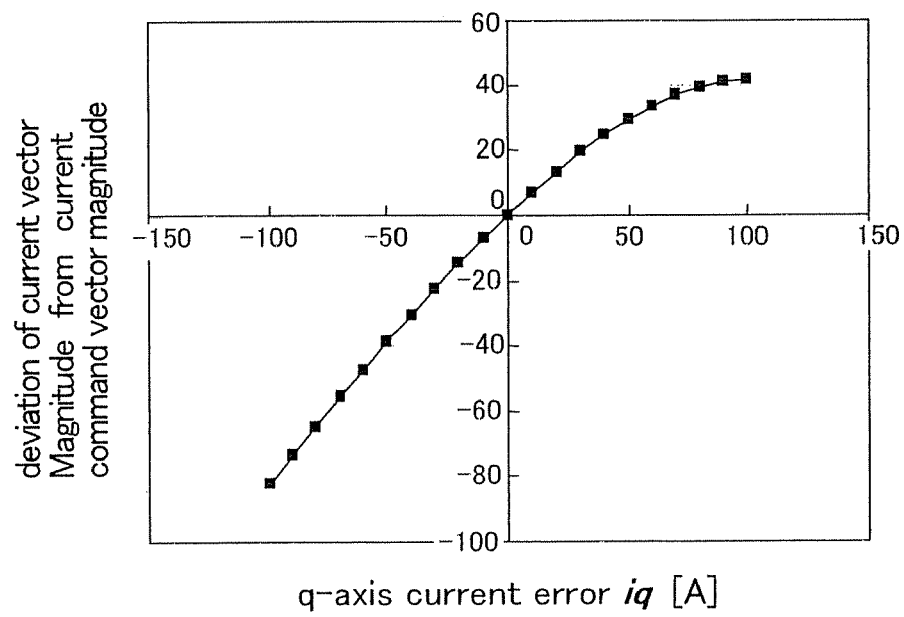
FIG. 9 is a graph showing a relation of the deviation between the magnitude of current command vectors and that of current vectors, to the q-axis current error, in Embodiment 1 of the invention.

The difference between a control phase-angle correcting value dTHV calculated using the equation (17) and that calculated using the equation (18) is explained below. FIG. 6 is a graph showing a relation (obtained using the equation (17)) of the deviation between the sum of squares of dq-axis current commands, and that of squares of dq-axis currents to the d-axis current error, in Embodiment 1 of the invention. FIG. 7 is a graph showing a relation (obtained using the equation (18)) of the deviation between the magnitude of the current command vector and that of the current vector to the d-axis current error, in Embodiment 1 of the invention. FIG. 8 is a graph showing a relation (obtained using the equation (17)) of the deviation between the sum of squares of dq-axis current commands, and that of squares of dq-axis currents to the q-axis current error, in Embodiment 1 of the invention. FIG. 9 is a graph showing a relation (obtained using the equation (18)) of the deviation between the magnitude of the current command vector and that of the current vector to the q-axis current error, in Embodiment 1 of the invention.

In FIGS. 6 and 7, respectively shown are a relation of the deviation (vertical axis) of the sum of squares of dq-axis currents from that of squares of dq-axis current commands, and a relation of the deviation (vertical axis) of the current vector magnitude from the current command vector magnitude, to a d-axis current error Δid (horizontal axis), when there is an error between the d-axis current id and the d-axis current command id* in a situation of the q-axis current iq being equal to the q-axis current command iq*, i.e., in a situation of the q-axis current error being zero. Here, the d-axis current error Δid denotes the subtraction of the d-axis current id from the d-axis current command id*.

As shown in FIGS. 6 and 7, it is found that both deviations have a similar characteristic such that they are substantially linear to the d-axis current error Δid in a range thereof being small (within ±50 A) although the vertical scales are different. In addition, the difference of the vertical scales is insignificant since it can be adjusted by the gain K5 in the equation (17).

In FIGS. 8 and 9, respectively shown are a relation of the deviation (vertical axis) of the sum of squares of dq-axis currents from that of squares of dq-axis current commands, and a relation of the deviation (vertical axis) of the current vector magnitude from the current command vector magnitude, to a q-axis current error Δiq (horizontal axis), when there is an error between the q-axis current iq and the q-axis current command iq* in a situation of the d-axis current id being equal to the d-axis current command id*, i.e., in a situation of the d-axis current error being zero. Here, the q-axis current error Δiq denotes the subtraction of the q-axis current command iq* from the d-axis current iq.

As shown in FIGS. 8 and 9, it is found that both deviations have a similar characteristic such that the deviations are substantially linear to the q-axis current error Δiq in a range thereof being small (within ±50 A) although the vertical scales are different. In addition, the difference of the vertical scales is insignificant since it can be adjusted by the gain K5 in the equation (17).

As described above, by using the equation (17), the control phase-angle correcting value dTHV can be calculated without lengthening the calculation time nor involving a significant load on the microcomputer.

Figure 10:
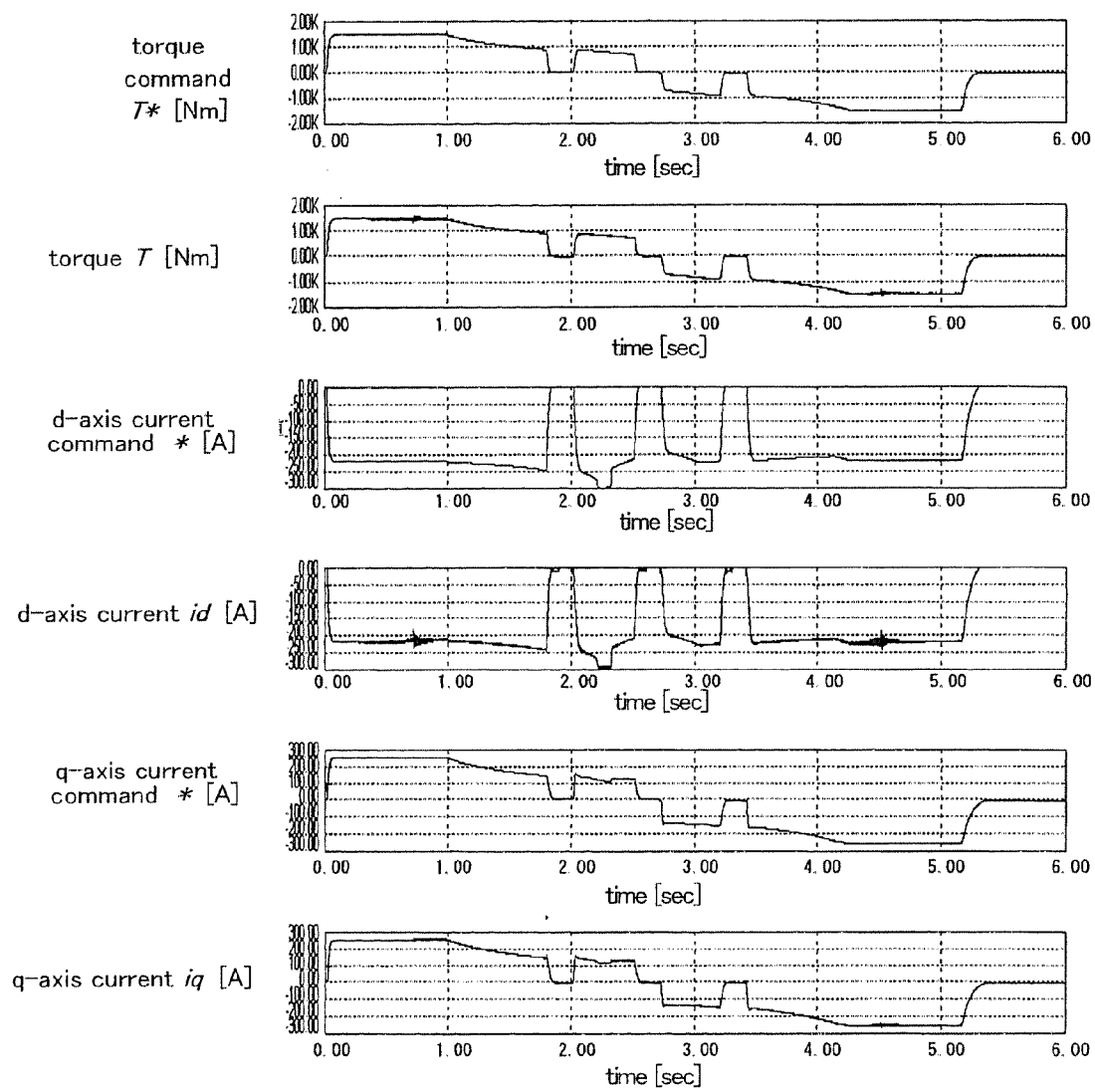
FIG. 10 illustrates charts showing simulated operating waveforms of torque commands, torques, d-axis current commands, d-axis currents, q-axis current commands, and q-axis currents, in Embodiment 1 of the invention.
Figure 11:
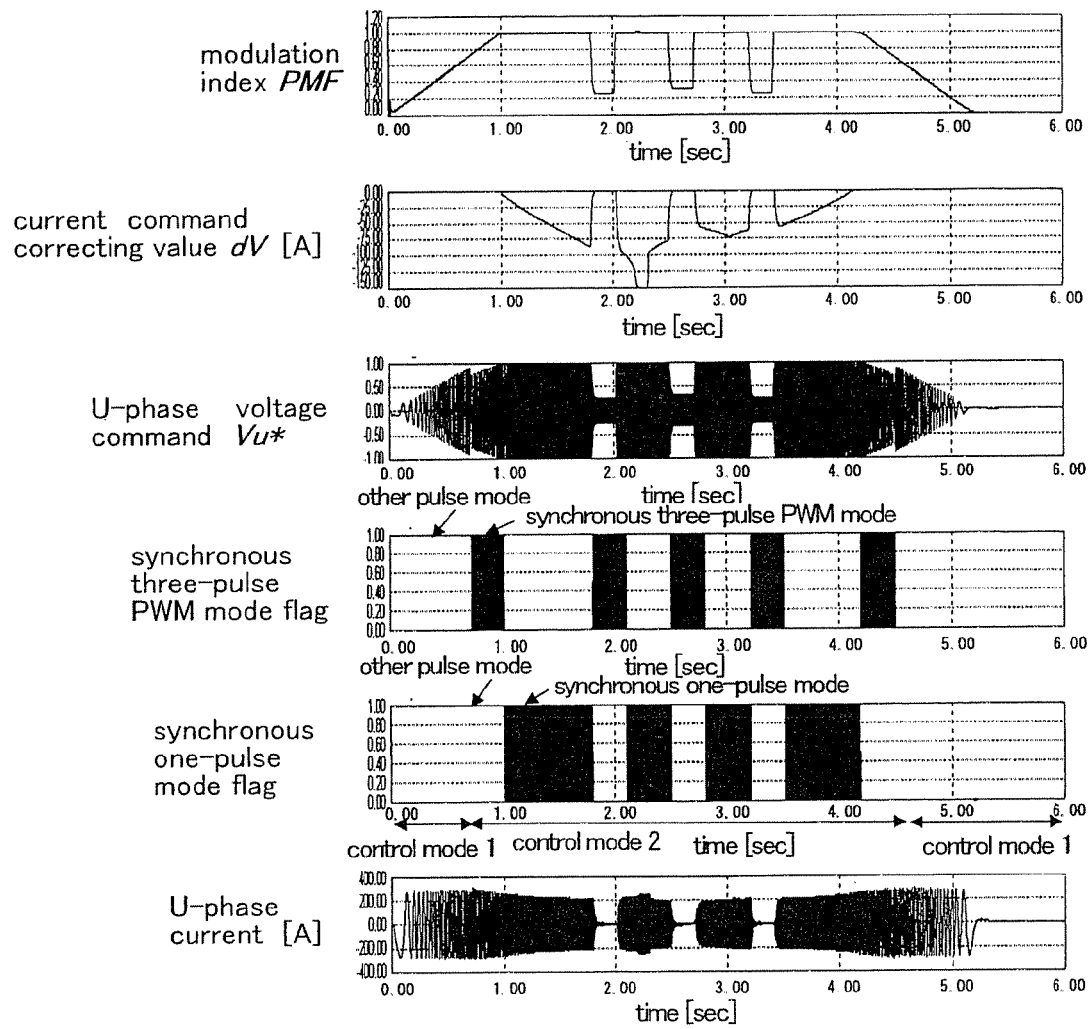
FIG. 11 illustrates charts showing simulated operating waveforms of modulation indexes, corrected current commands, U-phase voltage commands, synchronous three-pulse PWM mode flags, synchronous one-pulse mode flags, and U-phase currents, in Embodiment 1 of the invention.

FIGS. 10 and 11 illustrate charts showing simulated operating waveforms in Embodiment 1 of the invention. In FIG. 10, simulated operating waveforms of torque commands, torques, d-axis current commands, d-axis currents, q-axis current commands, and q-axis currents are illustrated, and in FIG. 11, simulated operating waveforms of modulation indexes, corrected current commands, U-phase voltage commands, synchronous three-pulse PWM mode flags, synchronous one-pulse mode flags, and U-phase currents. As illustrated in FIGS. 10 and 11, it is found that a stable operation is achieved during a power operation (during a time interval of 0 sec to 2.5 sec) and a regenerative operation (during a time interval of 2.7 sec to 5.3 sec), which is described in detail below.

During the time from 0 sec to around 0.7 sec, a voltage applied to the electric motor 6 and also the modulation index PMF linearly increase, and the multi-pulse PWM mode (its mode flag is not indicated in the figures) and control mode 1 are selected.

Since the modulation index PMF equals to or exceeds a predetermined value at the time around 0.7 sec, the synchronous three-pulse PWM mode and control mode 2 are selected. During the time from 0.7 sec to around 1.0 sec, the modulation index PMF further linearly increases but its magnitude is smaller than 1.0.

In addition, the magnitude of the U-phase voltage command Vu* decreases immediately after the change to the synchronous three-pulse PWM mode at the time around 0.7 sec, this is due to the command voltage magnitude PMFM that has been multiplied by 1.274 by the gain adjustment table 54 in the multi-pulse PWM mode is change to be multiplied by 1.0 as described above.

During from the boot-up to the time around 1.0 sec, the maximum torque control is taken by the current command generation unit 10, and the d-axis current command id* and the q-axis current command iq* are constant because the torque command T* is constant.

At the time around 1.0 sec, since the modulation index PMF reaches 1.0, the synchronous one-pulse mode is selected as the pulse mode and the corrected current command dV negatively increases, so that the d-axis current command id* further increases negatively accordingly. The d-axis current id follows the d-axis current command id*, to negatively increase. From that, it is found that the field-weakening control is desirably performed as well as the modulation index PMF is kept at a value infinitely close to 1.0, that is, the terminal voltage of the electric motor 6 is kept constant.

From the fact that the torque follows the torque command T*, it is found that the electric motor 6 stably accelerates its rotation speed because the torque command T* is reduced in inverse proportion to the rotation speed in order that the electric motor 6 operates to output constant power.

At the time around 1.8 sec, the torque command T* is once reduced to zero to stop the inverter 2 (the gate signals U, V, W, and X, Y, Z are all switched off). Then, the inverter is rebooted in a power operation mode at the time around 2.0 sec and operated in the power operation mode till the time around 2.5 sec. It is found that the torque T is also in coincidence with the torque command T* during the series of such operations, proving that the normal operation is performed.

Moreover, since the pulse modes are switched over depending on the modulation index PMF, it is found, from the flags of the synchronous three-pulse PWM mode and those of the synchronous one-pulse PWM mode, that the pulse mode is automatically changed to the synchronous three-pulse PWM mode when the modulation index PMF becomes smaller than 1.0 during the processes of the reduction of the torque command T* and of the reboot.

During the time from around 2.2 sec to 2.3 sec, the torque command T* becomes large with respect to the rotation speed, so that the electric motor 6 is operated in a range where the field-weakening control thereof is not theoretically realized. In that range, even though the d-axis current command id* is corrected to a negative using the corrected current command dV, the magnitude of the command output-voltage vector for the inverter cannot be reduced to the maximum voltage or less that the inverter is able to output. Since the corrected current command dV is however limited to those within a constant value (−150 A) that is determined from the modulation index PMF, the upper deviation-limit set value LIMH and the gain K, it is found that the corrected current command dV does not become excessively large.

At the time around 2.7 sec, the torque command T* is set to be negative, and the inverter is booted in the regenerative operation mode. At the time around 3.2 sec, the torque command T* is once set to zero to stop the inverter 2 (the gate signals U, V, W, and X, Y, Z are all switched off) and then the inverter is rebooted at the time around 3.4 sec. It is found that the torque T is also in coincidence with the torque command T* during the series of such operations, proving that the normal operation is performed.

It is also found that since the modulation index PMF becomes smaller than 1.0 during the processes of increasing and reducing the torque command T*, the pulse mode is automatically changed to the synchronous three-pulse PWM mode, and that the synchronous one-pulse PWM mode is automatically selected at the stage when the modulation index PMF reaches 1.0.

While the regenerative operation is continuously performed after the time around 3.4 sec, the d-axis current command id* is adjusted to be negative using the corrected current command dV, so that the field-weakening control is normally performed till the time around 4.2 sec.

After the time around 4.2 sec, since the terminal voltage of the electric motor 6 decreases owing to rotation speed reduction thereof, the modulation index PMF becomes less than 1.0 and the corrected current command dV automatically becomes zero. At the same time, the pulse mode is changed to the synchronous three-pulse PWM mode. With further decrease of the modulation index PMF at the time around 4.5 sec, the pulse mode is changed to the multi-pulse PWM mode and the control mode 1 is simultaneously selected.

In this way, it is found that the stable operations can be performed even in the field-weakening operation range and the transitions between the field-weakening operation range and the other ranges are also stably achieved. It is further found that the transitions between the control modes and between the pulse modes can be stably achieved.

As described above, the present invention can provide a vector controller for a permanent-magnet synchronous electric motor that can perform stable transitions in operation mode under a range from a low to a high rotation speed of the electric motor 6 with pulse modes and control modes of the inverter 2 being switched over, and can perform, with a configuration more simplified than conventional ones, a stable field-weakening operation in a one-pulse mode in which output voltage of the inverter 2 can be maximized in the high speed range.

The pulse modes and the control modes may be switched over based not on a modulation index but on a voltage command, motor frequency, inverter frequency, railcar speed, or the like.

The configuration described in Embodiment is an exemplar of the subject matter of the present invention and can be combined with another prior art. Modifying the configuration, for example, omitting part thereof can also be made within the scope of the invention.

While the subject matter of the invention has been described using an application to a controller for electric railcars in the specification, applicable fields are not limited to this. The invention can be applied to various related fields such as electric vehicles and elevators.

What is claimed is:

1. A vector controller for a permanent-magnet synchronous electric motor that controls an alternating current from an inverter that drives the permanent-magnet synchronous electric motor so as to come into coincidence with a current command, comprising:

a reference phase-angle calculation unit for generating a reference phase angle of the permanent-magnet synchronous electric motor;

a current command generation unit for generating the current command using a given torque command;

a current control unit for making a control calculation of a current error between the current command and a current through the permanent-magnet synchronous electric motor, to output the calculated current error;

a decoupling voltage calculation unit for calculating a feed-forward voltage using motor parameters of the permanent-magnet synchronous electric motor and the current command;

a modulation index calculation unit for outputting a modulation index for the inverter by receiving a direct-current voltage to the inverter and a voltage command that is the sum of the current error and the feed-forward voltage;

a control phase-angle calculation unit for outputting a control phase angle for the inverter by receiving the voltage command and the reference phase angle;

a pulse-width-modulation signal generation unit for generating pulse-width-modulation signals for the inverter using the modulation index and the control phase angle; and a current command compensator for correcting the current command using a corrected current command calculated based on the modulation index; wherein the current command compensator sets the corrected current command to a value obtained by processing through a time delay element and by multiplying by a predetermined constant the difference between the modulation index and a predetermined modulation index set value.

2. The vector controller for a permanent-magnet synchronous electric motor of claim 1, wherein the current command compensator, before multiplying by the predetermined constant the difference between the modulation index and the predetermined modulation index set value, limits the difference to a range between an upper and a lower deviation-limit set values.

3. The vector controller for a permanent-magnet synchronous electric motor of claim 2, wherein the upper deviation-limit set value is larger than zero and the lower-deviation-limit set value is equal to or smaller than zero.

4. The vector controller for a permanent-magnet synchronous electric motor of claim 2, wherein the upper deviation-limit set value is set based on a maximum field-weakening current necessary for the permanent-magnet synchronous electric motor to generate the command torque within a range of variation in the direct-current voltage to the inverter.

5. The vector controller for a permanent-magnet synchronous electric motor of claim 1, wherein the modulation index is defined as having a value of unity when the inverter outputs square waves whose fundamental wave component of line voltage of the inverter reaches a maximum.

6. The vector controller for a permanent-magnet synchronous electric motor of claim 1, wherein the modulation index set value is set to a modulation index by which the inverter outputs square waves whose fundamental wave component of line voltage of the inverter reaches a maximum.

7. The vector controller for a permanent-magnet synchronous electric motor of claim 1, wherein the pulse-width-modulation signal generation unit switches over pulse modes of the inverter depending on the modulation index.

8. The vector controller for a permanent-magnet synchronous electric motor of claim 1, wherein the pulse-width-modulation signal generation unit can hold a carrier signal at zero depending on the modulation index.

9. The vector controller for a permanent-magnet synchronous electric motor of claim 1, further comprising a parameter-error correction unit for calculating, from the current command and the current through the permanent-magnet synchronous electric motor, a control phase-angle correcting value used for correcting the control phase angle.

10. The vector controller for a permanent-magnet synchronous electric motor of claim 9, wherein the control phase-angle correcting value is calculated, by computing the vector control in a rotating coordinate system having a d-axis and a q-axis orthogonal to each other, based on the sum of squares of a d-axis and a q-axis components of the current command, and on that of squares of a d-axis and a q-axis components of the current through the permanent-magnet synchronous electric motor.

11. The vector controller for a permanent-magnet synchronous electric motor of claim 10, wherein the control phase-angle correcting value is calculated by taking a proportional-integral control of the difference between the sum of squares of a d-axis and a q-axis components of the current command, and the sum of squares of a d-axis and a q-axis components of the current through the permanent-magnet synchronous electric motor.

12. The vector controller for a permanent-magnet synchronous electric motor of claim 9, wherein the parameter-error correction unit determines whether to make the calculation based on a predetermined signal.

13. The vector controller for a permanent-magnet synchronous electric motor of claim 12, wherein the predetermined signal is the modulation index.

14. The vector controller for a permanent-magnet synchronous electric motor of claim 13, wherein the pulse-width-modulation signal generation unit switches over pulse modes of the inverter depending on the modulation index, and when the modulation index is higher than that corresponding to a lower limit at which a synchronous three-pulse pulse-width-modulation mode is selected for the inverter, the current control unit does not make its calculation and the parameter-error correction unit makes its calculation instead, and when the modulation index is lower than that corresponding to the lower limit at which the synchronous three-pulse pulse-width-modulation mode is selected for the inverter, the current control unit makes its calculation and the parameter-error correction unit does not make its calculation.

15. The vector controller for a permanent-magnet synchronous electric motor of claim 1, wherein the current control unit determines whether to make the calculation based on a predetermined signal.

16. The vector controller for a permanent-magnet synchronous electric motor of claim 15, wherein the predetermined signal is the modulation index.

* * * * *